United States Patent
Pishe et al.

(10) Patent No.: US 12,248,487 B2
(45) Date of Patent: Mar. 11, 2025

(54) TECHNIQUES FOR IN MEMORY KEY RANGE SEARCHES

(71) Applicant: Visa International Service Association, San Francisco, CA (US)

(72) Inventors: Naveen Pishe, San Ramon, CA (US); Abhilash Srimat Tirumala Pallerlamudi, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 192 days.

(21) Appl. No.: 17/831,240

(22) Filed: Jun. 2, 2022

(65) Prior Publication Data
US 2022/0292093 A1 Sep. 15, 2022

Related U.S. Application Data

(63) Continuation of application No. 16/315,491, filed as application No. PCT/US2016/053189 on Sep. 22, 2016, now Pat. No. 11,392,600.

(51) Int. Cl.
*G06F 16/00* (2019.01)
*G06F 16/22* (2019.01)
(Continued)

(52) U.S. Cl.
CPC ...... *G06F 16/2474* (2019.01); *G06F 16/2246* (2019.01); *G06F 16/2255* (2019.01); *G06F 16/248* (2019.01); *G06F 16/9027* (2019.01)

(58) Field of Classification Search
CPC ............ G06F 16/2474; G06F 16/2246; G06F 16/2255; G06F 16/248; G06F 16/9027
See application file for complete search history.

(56) References Cited

U.S. PATENT DOCUMENTS 5,204,958 A 4/1993 Cheng et al.
5,495,609 A 2/1996 Scott
(Continued)

FOREIGN PATENT DOCUMENTS

CN 101512525 A 8/2009
CN 103731432 A 4/2014
(Continued)

OTHER PUBLICATIONS

Application No. CN201680090849.X, Office Action, Mailed on Oct. 20, 2022, 27 pages.
(Continued)

*Primary Examiner* — Paul Kim
(74) *Attorney, Agent, or Firm* — Kilpatrick Townsend & Stockton LLP

(57) ABSTRACT

One embodiment of the invention is directed to a method for performing efficient key range searches in a distributed computing system. The method may comprise, receiving a first key (e.g., an alphanumeric identifier). A key range tree map associated with the first key may be identified from a plurality of key range tree maps. In some embodiments, individual key range tree maps map a set of minimum range values to a set of index values. The method may further comprise determining an index value associated with a second key using the determined key range tree map. Transaction processing data associated with the first key may be determined using the index value and provided to the requesting source. Utilizing the plurality of key range tree maps as described herein enables a key range search to be performed using on-board memory of an electronic device.

19 Claims, 10 Drawing Sheets

(51) Int. Cl.
  *G06F 16/2458* (2019.01)
  *G06F 16/248* (2019.01)
  *G06F 16/901* (2019.01)

(56) References Cited

U.S. PATENT DOCUMENTS

| | | | |
|---|---|---|---|
| 6,035,326 | A | 3/2000 | Miles et al. |
| 6,247,014 | B1 | 6/2001 | Ladwig et al. |
| 7,251,663 | B1 | 7/2007 | Smith |
| 7,287,033 | B2 | 10/2007 | Shadmon et al. |
| 7,370,055 | B1 | 5/2008 | Pande |
| 7,478,109 | B1 | 1/2009 | Panigrahy et al. |
| 7,499,912 | B2 | 3/2009 | Hershkovich et al. |
| 7,827,218 | B1 | 11/2010 | Mittal |
| 7,930,547 | B2 | 4/2011 | Hao et al. |
| 8,271,564 | B2 | 9/2012 | Dade |
| 8,397,051 | B2 | 3/2013 | Beaman et al. |
| 8,838,558 | B2 | 9/2014 | Luk |
| 9,009,165 | B2 | 4/2015 | Anand et al. |
| 9,384,145 | B2 | 7/2016 | Gura et al. |
| 2003/0033279 | A1 | 2/2003 | Gibson et al. |
| 2004/0015478 | A1* | 1/2004 | Pauly ............... G06F 16/2272 |
| 2004/0133590 | A1* | 7/2004 | Henderson ........ G06F 16/2246 707/999.102 |
| 2010/0262617 | A1* | 10/2010 | Shinjo ............... G06F 16/2246 707/769 |
| 2012/0166475 | A1 | 6/2012 | Zahn et al. |
| 2013/0103711 | A1* | 4/2013 | Woodruff ............... G06F 16/00 707/769 |
| 2014/0025708 | A1 | 1/2014 | Finis et al. |
| 2014/0337375 | A1 | 11/2014 | Yue |
| 2015/0312144 | A1 | 10/2015 | Gobriel et al. |
| 2016/0034486 | A1 | 2/2016 | Dageville et al. |
| 2016/0253322 | A1* | 9/2016 | Li ..................... G06F 16/137 707/747 |

FOREIGN PATENT DOCUMENTS

| | | | |
|---|---|---|---|
| CN | 101692651 | B | 12/2014 |
| CN | 105683898 | A | 6/2016 |
| EP | 0381418 | A2 | 8/1990 |
| WO | 0219063 | A2 | 3/2002 |
| WO | 0227426 | A2 | 4/2002 |
| WO | 2015180125 | A1 | 12/2015 |
| WO | 2016122548 | | 8/2016 |
| WO | 2018056992 | | 3/2018 |

OTHER PUBLICATIONS

U.S. Appl. No. 16/315,491, Final Office Action, Mailed on Dec. 29, 2021, 12 pages.
U.S. Appl. No. 16/315,491, Final Office Action, Mailed on Dec. 30, 2020, 23 pages.
U.S. Appl. No. 16/315,491, Non-Final Office Action, Mailed on Jun. 24, 2020, 22 pages.
U.S. Appl. No. 16/315,491, Non-Final Office Action, Mailed on Jun. 15, 2021, 24 pages.
U.S. Appl. No. 16/315,491, Notice of Allowance, Mailed on Mar. 4, 2022, 7 pages.
Application No. EP16916959.6, Extended European Search Report, Mailed on Apr. 6, 2020, 6 pages.
Application No. EP16916959.6, Office Action, Mailed on Nov. 16, 2021, 5 pages.
Kejriwal et al., "SLIK: Scalable Low-Latency Indexes for a Key-Value Store", USENIX, The Advanced Computing Systems Association, Jun. 22-24, 2016, pp. 57-70.
Application No. PCT/US2016/053189, International Preliminary Report on Patentability, Mailed on Apr. 4, 2019, 8 pages.
Application No. PCT/US2016/053189, International Search Report and Written Opinion, Mailed on Jun. 23, 2017, 11 pages.
Intention to Grant, mailed Sep. 29, 2023, European Patent Application No. EP16916959.6, 8 pages.
"Hash table", Wikipedia, the free encyclopedia, Available online at: https://web.archive.org/web/20151122095504/https://en.wikipedia.org/wiki/Hash_table, Nov. 22, 2015, 15 pages.
EP16916959.6, "Summons to Attend Oral Proceedings", Jan. 30, 2023, 10 pages.
Lu et al., "ScalaGiST", Proceedings of the VLDB Endowment, vol. 7, No. 14, Feb. 2, 2023, pp. 1797-1808.
Notice of Decision to Grant mailed May 30, 2023, Chinese Patent Application No. CN201680090849.X, 4 pages.

* cited by examiner

| KEY (INDEX VALUE) | VALUE (TRANSACTION PROCESSING DATA) |
|---|---|
| 0 | OTHER TRANSACTION PROCESSING DATA |
| 1 | OTHER TRANSACTION PROCESSING DATA |
| 2 | OTHER TRANSACTION PROCESSING DATA |
| 3 | OTHER TRANSACTION PROCESSING DATA |
| 4 | Transaction Processing Data corresponding to 4444 4454 9864 1222 |
| 5 | OTHER TRANSACTION PROCESSING DATA |
| 6 | OTHER TRANSACTION PROCESSING DATA |
| 7 | OTHER TRANSACTION PROCESSING DATA |
| 8 | OTHER TRANSACTION PROCESSING DATA |
| 9 | OTHER TRANSACTION PROCESSING DATA |
| 10 | OTHER TRANSACTION PROCESSING DATA |
| 11 | OTHER TRANSACTION PROCESSING DATA |
| ... | ... |

FIG. 8

TECHNIQUES FOR IN MEMORY KEY RANGE SEARCHES

CROSS REFERENCE TO RELATED APPLICATIONS

This application is a Continuation of U.S. patent application Ser. No. 16/315,491 filed Jan. 4, 2019, which is the US national stage of PCT/2016/053189, filed Sep. 22, 2016, the disclosures of which are incorporated herein by reference in their entirety.

BACKGROUND

Distributed computing systems are often used for managing and processing large data sets. A distributed computing system may distribute a data base on several computers, the computers communicating with one other through various communication media, such as high-speed networks. Distributed database systems may consist of a single logical database which may be split into different fragments, each fragment being stored on a single computer (e.g., a node) of the distributed computing system. Distributed computing systems may present challenges regarding how the large data set is managed and/or accessed. For example, the exchange of information and additional computations required to coordinate tasks between computers are a form of overhead that does not arise in centralized systems. Additionally, a distributed computing system may be prone for errors since it is more difficult to ensure correctness of algorithms when the data set is spread over many computers of the distributed computing system.

Current techniques for performing key range search may include constructing a search tree for the key ranges. However, the memory overhead of maintaining a search tree for a large set of key ranges can be impractical and even prohibitive, particularly when the key itself has a large size (e.g., 22 bytes). It may also be the case that search trees (and other containers such as tree maps and hash maps) are subject to particular memory constraints, making the storage of a large data set ineffective. For example, as an entry is inserted into the search tree, the tree may have to be sorted or regenerated to preserve the searching functionality. However, reconstructing or reordering a search tree as entries are added, deleted, and/or modified may result in extensive utilization of resources and may provide inaccurate search results or delayed processing. In some examples, a hash table may be constructed to map each possible value in a range to its corresponding data. However, such a hash table would utilize expensive memory and again, would present overhead concerns with respect to table management. Additionally, such search trees and/or hash tables may be too large (e.g., 5 TB) to load into memory (e.g., 128 GB of random access memory (RAM)) of a node in a distributed computing system so they are often stored in a centralized location. Searching for a key range in these scenarios may be computationally extensive and may result in variable search times as the size of the data being searched is large and many systems may be attempting to access the data at the same time. Accordingly, improvements may be made to the data set and the distributed computing system to provide more efficient search times.

Embodiments of the invention address these and other problems, individually and collectively.

BRIEF SUMMARY

One embodiment of the invention is directed to a method comprising receiving a first key. The method may further comprise identifying a key range tree map associated with the first key from a plurality of key range tree maps, individual key range tree maps mapping a set of minimum range values to a set of index values. The method may further comprise determining an index value associated with a second key using the determined key range tree map, the second key being associated with the first key. The method may further comprise determining transaction processing data associated with the first key using the index value, wherein utilizing the plurality of key range tree maps enables a key range search to be performed using on-board memory of an electronic device. The method may further comprise providing the determined transaction processing data associated with the first key.

Another embodiment of the invention is directed to a system that comprises one or more manager nodes, a plurality of worker nodes, and a centralized data store. The one or more manager nodes individually comprising a first processor, and a first computer readable medium coupled to the first processor, the first computer readable medium comprising code, executable by the first processor, for implementing a first method. The first method may comprise receiving a request message, the request message comprising a first key. The first method may further comprise transmitting at least a portion of the request message to one or more worker nodes of the plurality of worker nodes. The first method may further comprise receiving a response message associated with the request message. The first method may further comprise transmitting the response message. A worker node of the plurality of worker nodes may individually comprise a second processor, and a second computer readable medium coupled to the second processor, the second computer readable medium comprising code, executable by the second processor, for implementing a second method. The second method may comprise identifying a tree map of the plurality of tree maps using the first key and a hash map. The second method may further comprise determining an index value associated with a second key using the identified tree map, wherein using the identified tree map enables the index value to be determined using on-board memory of the worker node. The second method may further comprise determine transaction processing data associated with the second key utilizing the index value and an indexed list. The second method may further comprise providing the determined transaction processing data.

Another embodiment of the invention is directed to a system that comprises one or more manager nodes, a plurality of worker nodes, and a centralized data store. The one or more manager nodes individually comprising a first processor, and a first computer readable medium coupled to the first processor, the first computer readable medium comprising code, executable by the first processor, for implementing a first method. The first method may comprise receiving a request message, the request message comprising a first key. The first method may further comprise identifying a tree map of the plurality of tree maps using the first key and a hash map. The first method may further comprise sending information to a worker node of a plurality of worker nodes, the information comprising the first key, the worker node corresponding to the identified tree map. The first method may further comprise receiving a response message associated with the request message. The first method may further comprise transmitting the response message. A worker node of the plurality of worker nodes may individually comprise a second processor, and a second computer readable medium coupled to the second processor, the second computer readable medium comprising code, executable by the second processor, for implementing a second method. The second method may comprise determining an index value associated with a second key using the identified tree map, wherein using the identified tree map enables the index value to be determined using on-board memory of the worker node. The second method may further comprise determine transaction processing data associated with the second key utilizing the index value and an indexed list. The second method may further comprise providing the determined transaction processing data. The centralized data store may be accessible to the one or more manager nodes and the plurality of worker nodes. The centralized data store may store an indexed list, the indexed list comprising the transaction processing data.

Another embodiment of the invention is directed to an electronic device that comprises a processor, and a computer readable medium coupled to the processor, the computer readable medium comprising code, executable by the processor, for implementing a method. The method may comprise receiving an identifier associated with a dataset. The method may further comprise generating a indexed list from a data set, the indexed list mapping a plurality of index values to a plurality of transaction processing data of the data set. The method may further comprise storing the indexed list. For each entry of the indexed list, the method may further comprise determining a minimum range value of a range associated with the entry of the indexed list. The method may further comprise updating a tree map comprising the minimum range value and an index value associated with the entry of the indexed list. The method may further comprise updating a hash map with an alphanumeric identifier associated with the minimum range value and an identifier of the tree map.

Another embodiment of the invention is directed to an electronic device that comprises a processor, and a computer readable medium coupled to the processor, the computer readable medium comprising code, executable by the processor, for implementing a method. The method may comprise receiving an identifier associated with a dataset. The method may further comprise generating a indexed list from a data set, the indexed list mapping a plurality of index values to a plurality of transaction processing data of the data set. The method may further comprise storing the indexed list. For each entry of the indexed list, the method may further comprise determining a minimum range value of a range associated with the entry of the indexed list. The method may further comprise sending a tree map update request message comprising the minimum range value and an index value associated with the entry of the indexed list, wherein receipt of the tree map update request message causes a tree map to be updated with the minimum range value and the index value associated with the entry of the indexed list. The method may further comprise updating a hash map with an alphanumeric identifier associated with the minimum range value and an identifier of the tree map.

These and other embodiments of the invention are described in further detail below.

BRIEF DESCRIPTION OF THE DRAWINGS

FIG. 8 shows a fourth example data structure that may be utilized by the distributed computing system in accordance with at least one embodiment.

DETAILED DESCRIPTION

Figure 1:
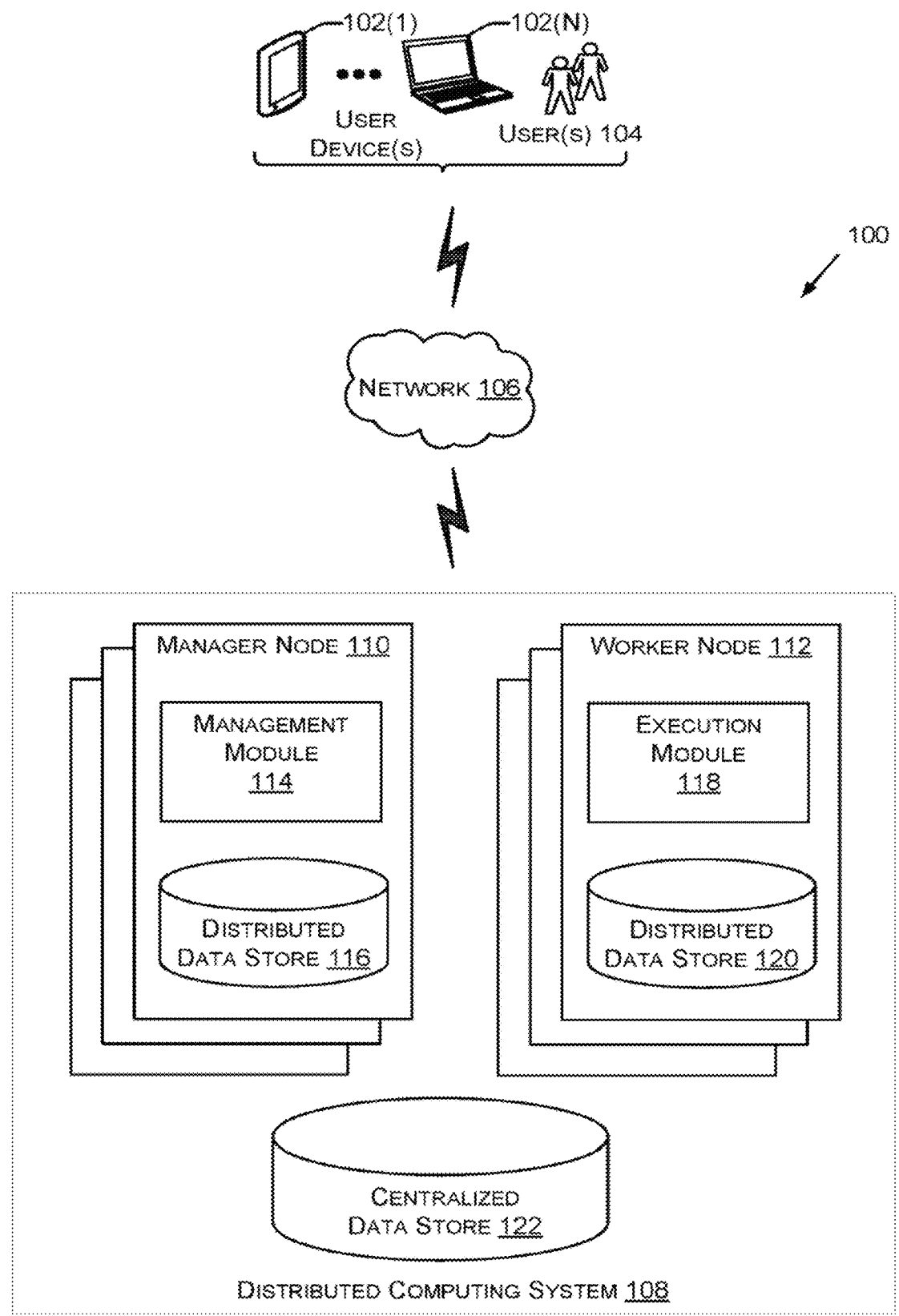
FIG. 1 depicts an example distributed computing environment in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "distributed computing system" may refer to a collection of electronic devices communicatively coupled with one another. In some embodiments, subsets of a larger data set may be distributed amongst the distributed computing system (e.g., on memory within nodes of the system). The collection of electronic devices may be utilized to perform various functions (e.g., tasks). In some examples, the collection of electronic devices may include one or more manager nodes, one or more worker nodes, and/or one or more databases.

A "manager node" may be an electronic device that may be used to manage other nodes (e.g., worker nodes) in a distributed computing system. A manager node, in some examples, may be responsible for dispatching work (e.g., tasks) to one or more other nodes (e.g., worker nodes) in the distributed computing system. In some examples, a manager node may maintain a map (e.g., a hash map) that maps a key (e.g., an account identifier) to a value (e.g., a hash map). For example, a manager node may maintain a hash map that receive an account identifier as input and outputs an identifier for another hash map. The manager node may be responsible for determining where the identified hash map corresponding to the key (e.g., the account identifier) is located (e.g., a particular node in the distributed computing system). The manager node may transmit information (e.g., request messages) to various nodes in the distributed computing system, and may receive information (e.g., response messages) from the various nodes on completion of the corresponding task(s) or at another suitable time.

A "worker node" may be an electronic device that may be used to process data (e.g., tasks) in a distributed computing system. In some examples, a worker node may receive information (e.g., a request message) from a manager node. The worker node may be responsible for performing various operations in order to perform a function (e.g., look up data). Upon processing the request, or at another suitable time, the worker node may transmit information (e.g., a response message) to another node in the distributed computing system (e.g., a manager node). In at least some example, the worker node may include some amount (e.g., 128 gigabytes (GB), 1 terabyte (TB), etc.) of on-board memory (e.g., RAM) from which it may utilize during processing.

"Transaction processing data" may include data associated with a transaction. It may refer to any suitable data associated with a key. In some embodiments, transaction processing data may be payment account data associated with a user. In some embodiments, transaction processing data may include a shipping address, billing address, or other pertinent information associated with a consumer. In some examples, transaction processing data may include one or more account identifiers. In some embodiments, the account identifier may be a payment card number (PAN) and/or primary account number. A PAN may be 14, 16, or 18 digits. Transaction processing data may also include an expiration date associated with an account, as well as a service code and/or verification values (e.g., CVV, CVV2, dCVV, and dCVV2 values). Transaction processing data may additionally, or alternatively, include past purchase information, navigational information related to website usage, fraudulent transaction rules associated with an account, or any suitable data for which a search may be conducted. Such data may, or may not, pertain to a consumer account/transaction.

A "protocol set" may be a set of rules or configuration settings that indicates one or more actions are allowed and/or should be performed. In some cases, a protocol set may include conditions upon which those actions are to be performed. In some embodiments, a protocol set may include conditional statements, such as "if x_condition occurs, then perform y_action." In some embodiments, a protocol set may include policies for specifying when and/or what particular actions should be performed in relation to detecting fraudulent transactions. In some examples, the protocol set may be stored with other protocol sets in a storage container for protocol sets.

A "request message" is an electronic message that may include any suitable information necessary for requesting data (e.g., transaction processing data, fraudulent transaction protocol set(s), etc.). In some embodiments, the request message may be directed to a manager node of a distributed computing system and/or between nodes (e.g., between manager and worker, between worker and worker, etc.) of the distributed computing system. In some embodiments, a request message may include one or more keys (e.g., account identifier, card number, etc.) to be utilized to search for the requested data.

A "response message" may include any suitable information necessary for providing data related to the request message. For example, the response message may include the data requested (e.g., transaction processing data, a fraudulent transaction protocol set, etc.).

A "hash map" may include a data structure that can be used to implement an associative array, a data structure that can map keys to values. A hash map may be an unsorted collection of keys. A hash map may utilize a hash function to compute an index into an array of keys, from which a desired value can be found (e.g., a value associated with a particular key). In at least one example, a hash map may provide O(1) algorithmic complexity when used to perform searches.

A "key" may include any suitable data (e.g., an account identifier, an alphanumeric identifier, a data object, a social security number, a name, etc.) for which a value may be associated.

A "tree map" may include a data structure that maps keys to values and is sorted according to the natural ordering of its keys. Upon inserting and/or removing an entry (e.g., a key/value pair) of a tree map, the tree map will be reordered to ensure that the keys are always ordered.

"Algorithmic Complexity" refers to how fast or slow a particular algorithm performs. For example, an average case runtime complexity of an algorithm as a function defined by an average number of sets taken on any instance of size x. An algorithm is said to run in constant time if it requires the same amount of time regardless of the input size. For example, accessing an element in an array runs in constant time (otherwise notated by "O(1)") because accessing an element of the array doesn't depend on how many elements are stored in the array. Algorithmic complexity is further discussed below with respect to FIG. 4.

"Big O notation," denoted by O(x) denotes the performance or complexity of an algorithm. Big O notation specifically describes the worst-case scenario and can be used to describe the execution time required or the space used (e.g., in memory or on disk) by an algorithm. Said another way, Big O notation describes the limiting behavior of a function when the argument tends towards a particular value or infinity. Big O notation is often used to classify algorithms by how they respond to changes in input size, such as how the processing time of an algorithm changes as the problem size becomes extremely large.

A "tree map update request message" may include information pertaining to an creation and/or modification of a tree map. For example, a tree map update request message may include a key (e.g., a minimum PAN) and a value (e.g., an index value) which may be stored in a tree map, for example, on a worker node in a distributed computing environment.

A "minimum PAN" may refer to a minimum range value corresponding to a range. Although examples herein use minimum PANs that are minimum range values for a range of primary account numbers, any suitable range (e.g., social security ranges, integer ranges, distance ranges, temperature ranges, and the like) may be utilized, in which case the minimum PAN merely refers to the lower range value of the range.

A "tree map update response message" may include an indication as to the successfulness of a tree map update request. For example, a tree map update response message may indicate whether the update was successful or unsuccessful. In some examples, if the update is unsuccessful, the tree map update response message may include an indication as to why the update was unsuccessful (e.g., memory full, key already exists, etc.).

A "maximum PAN" may refer to a maximum range value corresponding to a range. Although examples herein use maximum PANs that are maximum range values for a range of primary account numbers, any suitable range (e.g., social security ranges, integer ranges, distance ranges, temperature ranges, and the like) may be utilized, in which case the maximum PAN merely refers to the upper range value of the range.

A "indexed list" may be a data structure that map keys (e.g., index values) to values. In at least one example, an indexed list may be an array that maps index values to transaction processing data. In a further example, an indexed list may be an array that maps index values to a maximum PAN. In at least one example, an indexed list may provide O(1) algorithmic complexity when used to perform searches.

A "user device" may be an electronic device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

As distributed computing systems are widely used to manage large data sets, the ability to perform efficient key range searches is of tantamount concern. Specifically, the ability to map key ranges (e.g., from a minimum key to a maximum key) to particular data (e.g., transaction processing data) is an important component of transaction processing systems. For example, the key may be an alphanumeric identifier such as a social security number, a temperature, a primary account number (PAN), or the like, and key ranges may map to information required for transaction processing (e.g., information corresponding to a range of social security numbers, a protocol set for determining when transactions are fraudulent, etc.). When the number of key ranges grows large, the search for a particular key range can be a computationally expensive operation. In current systems, a master database may be accessible by each node of the distributed computing system. However, such an approach presents challenges. For example, maintaining a master database on disk may result in variable search times as the data set is large and difficult to search. Another way to implement a search is to construct a search tree for the key ranges which may provide various drawbacks with respect to providing efficient search time and may also be computationally expensive. Additionally, the data set may be too large to store in a container (e.g., a hash map, a tree map, an indexed list, etc.) due to memory constraints of the container. To preserve the efficiency provided by a search tree within practical memory constraints, the set of key ranges can be partitioned into tractable subsets, each associated with smaller search trees. Somewhat non-intuitively, this requires the introduction of additional maps including a hash map of keys to associated key range tree map partitions, where the key range tree map maps keys to an index value that can be used to obtain the maximum key range (when the key ranges are not contiguous). The index value may also be used to obtain the transaction processing data associated with the key range. By utilizing these customized data structures, a key range search may be performed efficiently (e.g., with O(log n) algorithmic complexity). Although useful in particular for financial transaction processing, this invention is broadly applicable to applications that use key range tree maps with large numbers of key ranges and large key sizes. For example, although examples described herein utilize primary account ranges and keys, other ranges, such as social security ranges, temperature ranges, or any suitable range of values having a minimum range value and a maximum range value, may be used.

Embodiments of the inventions are directed to methods and systems that may be utilized to manage a number of data structures on a set of nodes of a distributed computing system. Utilization of the data structures described herein enables the distributed computing system to distribute the data set among the set of nodes in order to provide constant O(log n) algorithmic efficiency when performing data searches. In some embodiments, the system may receive data set identification information that specifies a data set and/or location of a data set to be distributed. The system may break apart the data set into smaller portions to be stored in customized data structures on the set of nodes. In some examples, the system may determine available storage space on each of a set of nodes (e.g., some portion of nodes of a distributed computing system) and generate the data structures described herein according to the available storage space on each node. In at least one embodiment, the system may cause a data structure to be created that provides an indexed list (e.g., an array) that maps index values to transaction processing data (e.g., the requested data). The system may further cause a data structure to be created that provides a separate indexed list (e.g., another array) that maps index values to a maximum PAN (or other suitable value). In at least one example, the transaction processing data and it's corresponding maximum PAN may each be located at a same index (e.g., a common index value) within their respective indexed lists. Additionally, the system may cause a set of tree maps to be maintained on a set of nodes (e.g., worker nodes), an individual tree map of the set of tree maps providing a map of keys (e.g., a minimum PAN) to index values (e.g., index values of the indexed lists). The system may further cause a processor on a same or different set of nodes (e.g., one or more manager nodes) to maintain a hash map that maps keys (e.g., PANs, account identifiers, etc.) to a tree map (e.g., the tree map that includes a mapping of a corresponding minimum PAN to an index value).

In at least one embodiment, the system (e.g., a distributed computing system) may receive a request message for transaction processing data associated with a key (e.g., a PAN, an account identifier, an alphanumeric identifier, etc.). In at least one example, the request message may be received by a manager node of the distributed system. The manager node may forward some portion of the request (e.g., the account identifier) to a worker nodes of the distributed computing system. The worker node may utilize a hash function to hash the key to determine a hashed key. The hashed key may be utilized to return a tree map identifier that corresponds to the key. The worker node may utilize the key (e.g., the PAN) to determine a minimum PAN corresponding to the key. For example, if the PAN is "4444 4454 9864 1222," the minimum PAN associated with the account number may be "4444 4444 4444 4444. The worker node may utilize the minimum PAN to determine an index value by providing the minimum PAN as input into the identified tree map and receiving the output of the index number associated with the minimum PAN. In some examples (e.g., examples in which the minimum PAN to maximum PAN range is not consistent between ranges), the worker node may then utilize the index value returned in order to retrieve a value (e.g., a maximum PAN) from a first indexed list (e.g., an indexed list that maps index values to maximum PANs). The worker node may further utilize the index value in order to retrieve a value (e.g., transaction processing data) from a second indexed list (e.g., an indexed list that maps index values to transaction processing data). The value retrieved from the second indexed list may return transaction processing data associated with the minimum PAN/maximum PAN key range. In at least one example, the first and second indexed lists may be stored in memory (e.g., RAM) of the worker node. The returned transaction processing data may be provided to the manager node, and eventually, a user device having initiated the request message.

In at least one embodiment, the system (e.g., a distributed computing system) may receive a request message for transaction processing data associated with a key (e.g., a PAN, an account identifier, an alphanumeric identifier, etc.). In at least one example, the request message may be received by a manager node of the distributed system. The manager node may utilize a hash function to hash the key to determine a hashed key. The hashed key may be utilized to return the location of a tree map or a tree map identifier that corresponds to the key (e.g., by providing the hashed key to a hash map stored by the manager node and receiving the location/identifier returned by the hash map. The manager node may utilize the returned location or identifier to provide the request message to a particular worker node of the distributed computing system. The worker node, upon receipt of the request message, or at another suitable time, may utilize the key (e.g., the PAN) to determine a minimum PAN corresponding to the key. The worker node may utilize the minimum PAN to determine an index value by providing the minimum PAN as input into the tree map and receiving the output of the index number associated with the minimum PAN. In some examples (e.g., examples in which the minimum PAN to maximum PAN range is not consistent between ranges), the worker node may then utilize the index value returned in order to retrieve a value (e.g., a maximum PAN) from a first indexed list (e.g., an indexed list that maps index values to maximum PANs). The worker node may further utilize the index value in order to retrieve a value (e.g., transaction processing data) from a second indexed list (e.g., an indexed list that maps index values to transaction processing data). The value retrieved from the second indexed list may return transaction processing data associated with the minimum PAN/maximum PAN key range. In some examples, the first and/or second indexed lists may be stored in memory (e.g., RAM) of the worker node and/or in a centralized storage location. The returned transaction processing data may be provided to the manager node, and eventually, a user device having initiated the request message.

FIG. 1 depicts an example distributed computing environment 100 in accordance with at least some embodiments. The distributed computing environment 100 may comprise one or more user devices 102(1)-102(N) (hereinafter "the user devices 102) operated by users 104. The user devices 102 may also be in communication, via network 106, with distributed computing system 108. The user devices 102 may be operable by one or more of the users 104 to access the distributed computing system 108 via the network 106. The user devices 102 may be any suitable device capable of communicating with the network 106. For example, the user devices 102 may be any suitable computing device such as, but not limited to, a mobile phone, a smart phone, a personal digital assistant (PDA), a laptop computer, a thin-client device, a tablet PC, a desktop computer, a set-top box, or other computing device.

The distributed computing system 108 may have any suitable characteristics. The distributed computing system 108 may include one or more manager nodes (e.g., a manager node 110), one or more worker nodes (e.g., a worker node 112), and one or more centralized data stores (e.g., a centralized data store 122) for performing the functionality described herein. The manager node 110 and the worker node 112 may be communicatively coupled to one another. The manager node 110, in conjunction with a data process, may include a management module 114 that is configured to perform functionality including receiving/processing/transmitting request messages, receiving/processing/transmitting response messages, receiving/processing/transmitting hash map update request/response messages, maintaining one or more data structures, and causing one or more other data structures to be maintained on the worker node 112 and/or the centralized data store 122. The manager node 110 may further include a distributed data store 116 that is configured to store the one or more data structures. For example, the distributed data store 116 may be configured to store a hash map that maps a key (e.g., a PAN, an account identifier, alphanumeric identifier, etc.) to a tree map (e.g., a tree map stored on distributed data store 120 of the worker node 112, discussed further below). In at least one example, the distributed data store 116 may be random access memory (RAM) of the manager node 116.

The worker node 112, in conjunction with a data process, may include an execution module 118. The execution module 118 may be configured to perform functionality including receiving and processing request messages, transmitting response messages, receiving tree map update request messages, transmitting tree map update response messages, and maintaining one or more data structures associated with a larger data set. The worker node 112 may further include a distributed data store 120. The distributed data store 120 may be configured to store the one or more data structures associated with a larger data set and/or any suitable information. For example, the distributed data store 120 may be configured to store a hash map that maps keys (e.g., PANs) to values (e.g., tree maps), one or more tree maps that individually map keys (e.g., minimum PANs) to index values, one or more indexed lists that map index values to maximum PANs (or other suitable data), and/or one or more indexed lists that map index values to transaction processing data. In at least one example, the distributed data store 120 may be random access memory (RAM) of the worker node 112.

The distributed computing system 108 may further include a centralized data store (e.g., the centralized data store 122). The centralized data store may be configured to store one or more data structures associated with a larger data set. For example, the centralized data store 122 may be configured to store one or more indexed lists. For example, the centralized data store 122 may store an indexed list that maps an index value to transaction processing data (fraud transaction protocol sets) or any suitable data. The centralized data store 122 may additionally, or alternatively, store an indexed list that maps an index value to a maximum PAN. In at least one embodiment, the centralized data store 122 may be accessible by manager node 110 and/or the worker node 112. The centralized data store 122 does not necessarily need to be provided by a single device, but may instead be provided by a number of devices.

Messages between the computers, networks, and devices in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Each of the entities in FIG. 1 may communicate through any suitable communication channel or communications network (e.g., the network 106). A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
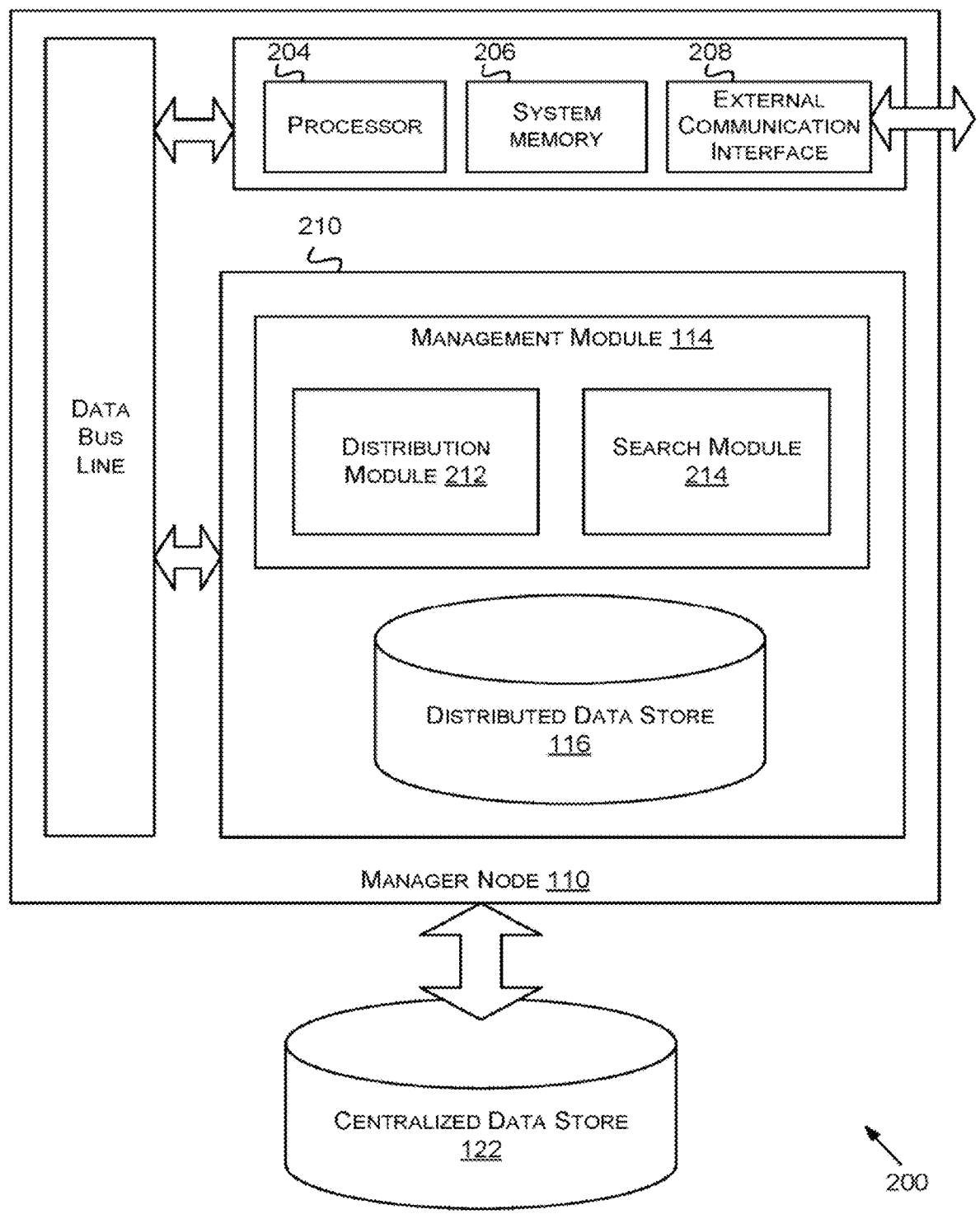
FIG. 2 depicts an example computer architecture capable of implementing at least some embodiments of a manager node of a distributed computing system.

FIG. 2 depicts an example computer architecture 200 capable of implementing at least some embodiments of a manager node (e.g., the manager node 110 of FIG. 1) of the distributed computing system 108 of FIG. 1. The manager node 110 may individually include a processor and a computer readable medium coupled to the processor, the computer readable medium comprising code, executable by the processor for performing the functionality described herein. It should be appreciated that any functionality described with respect to the modules of FIG. 2 may be combined to be performed by a single module or may be performed by a module that is external to the manager node 110. FIG. 2 shows the manager node 110 communicatively couple to the centralized data store 122. The centralized data store 122 may be configured as depicted in FIG. 2, or the centralized data store 122 may be provided, in whole or in part, as part of the manager node 110. The distributed data store 116, the centralized data store 122 (as well as any other database described herein) may be a conventional, fault tolerant, relational, scalable, secure database such as Oracle™ or Sybase™. In at least one example the distributed data store 116 and/or the centralized data store 122 (as well as any other database described herein) may be a Hadoop™ Distributed File System designed to store very large data sets reliably and to stream those data sets at high bandwidth to user applications. The distributed data store 116 and/or the centralized data store 122 may be implemented using various data structures, such as an array, hash map, (linked) list, structured text file (e.g., XML), table, and/or the like. Such data structures may be stored in memory and/or in structured files.

The manager node 110 may comprise a processor 204, which may be coupled to a system memory 206 and an external communication interface 208. A computer readable medium 210 may also be operatively coupled to the processor 204.

The computer readable medium 210 may comprise a number of software modules including a distribution module 212 and a search processing module 214. More or fewer modules may be utilized to perform the functionality described herein.

The distribution module 212 may comprise code, that when executed, causes the processor 204 to determine a distribution of portions of a data set. For example, the distribution module 212 may be configured to cause the processor 204 to receive a request to distribute portions of a data set. The request may include an identifier for the data set. In response to the request, the distribution module 212 may be configured to cause the processor 204 to access the identified data set (e.g., stored in the centralized data store 122 or another suitable location) and to generate one or more data structures (e.g., some combination of the data structures of FIGS. 5-8) to store a portion of the data set. For example, the distribution module 212 may be configured to cause the processor 204 to execute code to generate an indexed list (e.g., data structure 800, discussed below). The indexed list may map an index value (e.g., 0, 1, 2, 3, etc.) to a values (e.g., transaction processing data of the data set). For example, the distribution module 212 may be configured to cause the processor 204 to generate an indexed list of transaction processing data in an order in which it was created/received. The distribution module 212 may be configured to cause the processor 204 store the indexed list in memory (e.g., on the worker node 112, on the centralized data store 122, etc.). In examples in which minimum PAN/maximum PAN ranges vary and/or are non-contiguous, the distribution module 212 may be configured to cause the processor 204 to generate an additional indexed list of maximum PANs (e.g., the data structure 700, discussed below). As a simple example, consider that minimum PAN/maximum PAN ranges are as follows: 0-100, 101-150, 151-160, 161-200, 210-300, etc. In this example, because the ranges vary and are non-contiguous, an indexed list mapping index value to maximum PAN is needed. In examples in which the ranges are contiguous, the additional indexed list may not be necessary because the maximum PAN of a previous range is always 1 less than the minimum PAN of the next range. Additionally, if the ranges are constant, than the additional indexed list may not be necessary because the maximum PAN is always x more than the previous minimum PAN. In at least one example, the distribution module 212 may be configured to cause the processor 204 to use the same index value in both indexed lists such that the maximum PAN and the transaction processing data share a common index number (e.g., both are at position 4 of their respective indexed lists). In at least one example, the distribution module 212 may cause multiple indexed lists (e.g., multiple index value/maximum PAN indexed lists, multiple index value/transaction processing data indexed lists) to be created and stored in memory on one or more worker nodes, on the centralized data store 122 or in any suitable storage location.

In accordance with at least one embodiment, the distribution module 212 may cause the processor 204 to determine minimum PANs that corresponds to each entry in the transaction processing data indexed list. In at least some examples, the distribution module 212 may cause the processor 204 to update/generate one or more tree maps that include mappings of the minimum PANs to index values that correspond to the appropriate transaction processing data in the indexed list(s). In at least one example, the distribution module 212 may send the tree maps to the worker node 112 in order to cause tree maps to be stored on the worker node 112.

In at least one example, the distribution module 212 may cause the processor 204 to determine minimum PANs that correspond to each entry in the transaction processing data indexed list. In at least some examples, the distribution module 212 may cause the processor 204 to determine available memory on at least one node (e.g., the worker node 112 of FIG. 1) of the distributed computing system 108. The distribution module 212 may cause the processor 204 to transmit a tree map update request message to the worker node 112 in order to cause an entry in a tree map to be created/updated on the worker node 112. The tree map update request message may include a key (e.g., the minimum PAN) and a value (e.g., the index value). The created/updated tree map may be stored on the worker node 112. Upon inserting the new key/index value pair, the tree map may be automatically resorted such that the keys of the tree map are ordered within the tree. In at least one example, the distribution module 212 may cause the processor 204 to receive a tree map update response message from the worker node 112. The tree map update response message may indicate whether or not the entry was successfully created/updated within the tree map. In at least one example, further processing may depend on the contents of the tree map update response message (e.g., an indication of success/failure, a reason identifier, etc.). For example, if the tree map update response message indicates that the entry was not created/updated in the tree map of the worker node 112, then the distribution module 212 may cause the processor 204 to cease processing the distribution of the data set, or in some cases, of that entry. In accordance with at least one embodiment, the distribution module 212 may cause the processor 204 to provide a user device (e.g., the user devices 102 of FIG. 1) the indication and/or reason.

In some cases, the distribution module 212 may cause the processor 204 to transmit a tree map update request message to another worker node in the distributed computing system, while in other examples, the distribution module 212 may cause the processor 204 to cease processing the failed entry.

In at least one example, the distribution module 212 may cause the processor 204 to create and/or update an entry of a hash map. The hash map may map a key (e.g., a PAN) to a value (e.g., an identifier of the tree map located on the worker node 112, the location of the tree map, etc.). The distribution module 212 may cause the processor 204 to store the created/updated hash map in local storage (.e.g., the distributed data store 116, the distributed data store 120, or the like). As depicted in FIG. 2, the distributed data store 116 may be included as part of the manager node 110 (e.g., random access memory (RAM) of the manager node 110).

Distributed data store 120 may be included as part of the worker node 112 (e.g., RAM of the worker node 112). In at least one example, the distribution module 212 may perform the aforementioned functions for each entry of the data set, or at least some portion of the data set, in order to distribute information about the data set/portion amongst one or more worker nodes and the manager node. The hash map stored on the distributed data store 116 or the distributed data store 120 may serve as a tool for locating particular data once distribution has commenced/completed.

The search processing module 214 may comprise code that, when executed, causes the processor 204 to receive and process request messages (e.g., from the user devices 102 of FIG. 1). In at least one embodiment, the search processing module 214 may be configured to cause the processor 204 to transmit request messages to one or more worker nodes (e.g., the worker node 112) of the distributed computing system 108 of FIG. 1. The search processing module 214 may further be configured to cause the processor 204 to receive and process response messages from the worker nodes (e.g., the worker node 112), and/or to transmit response messages to the user devices 102. The search processing module 214 may further be configured to cause the processor 204 to perform key ranges searches utilizing an internally-stored data structure (e.g., the hash map that maps PANs to tree maps such as data structure 500 of FIG. 5, discussed below). The search processing module 214 may further be configured to utilize an index value to perform a query to the centralized data store 122. In at least one example, the centralized data store 122 may be configured to store one or more data structures (e.g., one or more indexed lists) that associated a key (e.g., an index value) to a return value (e.g., transaction processing data, a maximum PAN, etc.).

Figure 3:
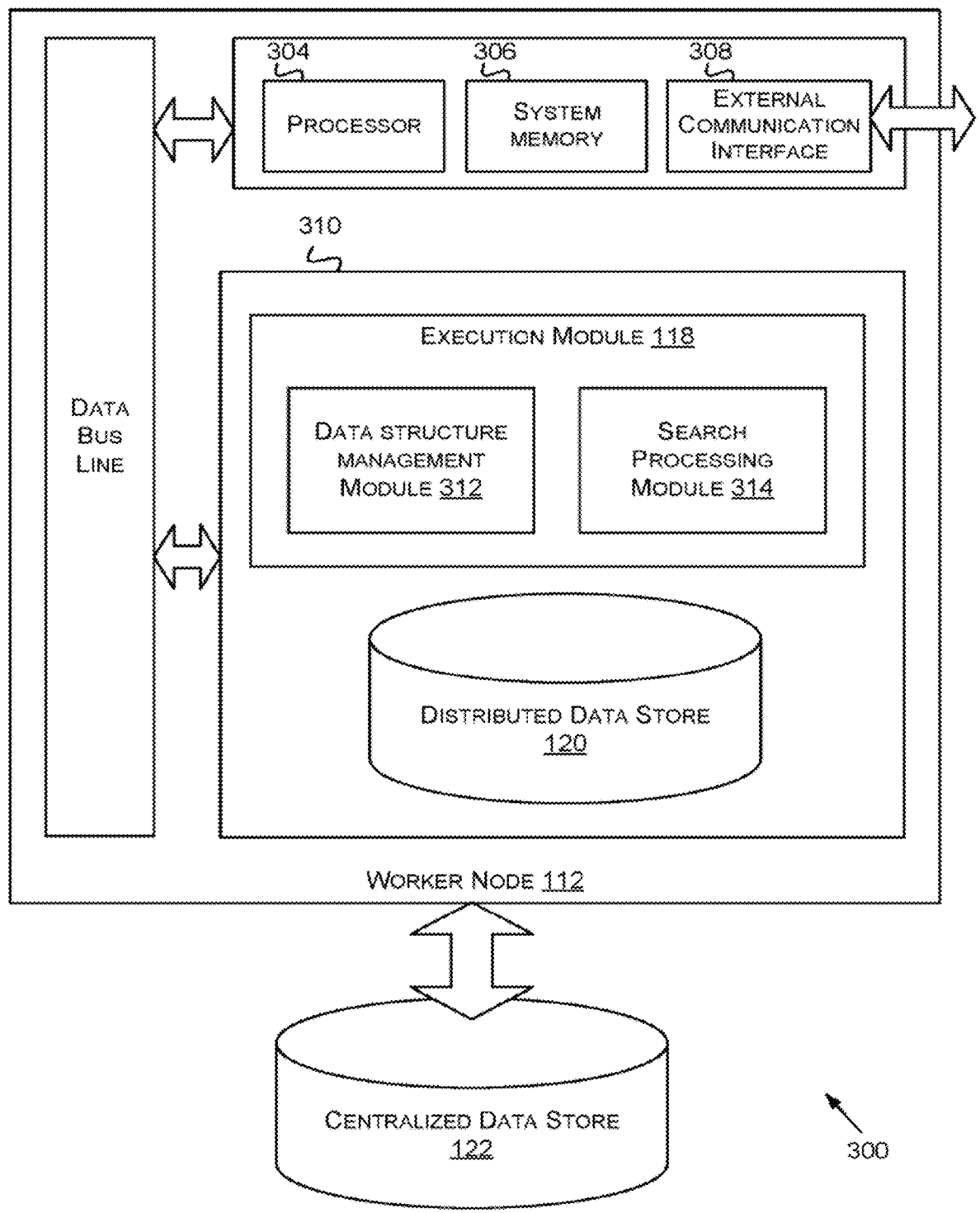
FIG. 3 shows an example computer architecture capable of implementing at least some embodiments of a worker node of a distributed computing system.

FIG. 3 depicts an example computer architecture 300 capable of implementing at least some embodiments of a worker node (e.g., the worker node 112 of FIG. 1) of the distributed computing system 108 of FIG. 1. The worker node 112 may individually include a processor 304 and a computer readable medium 310 coupled to the processor 304, the computer readable medium 310 comprising code, executable by the processor for performing the functionality described herein. It should be appreciated that any functionality described with respect to the modules of FIG. 3 may be combined to be performed by a single module or may be performed by a module that is external to the worker node 112. FIG. 3 shows the worker node 112 communicatively couple to the centralized data store 122. The centralized data store 122 may be configured as depicted in FIG. 3, or the centralized data store 122 may be provided, in whole or in part, as part of the worker node 112. The distributed data store 120 and/or the centralized data store 122 may be implemented using various data structures, such as an array, hash map, (linked) list, structured text file (e.g., XML), table, and/or the like. Such data structures may be stored in memory and/or in structured files.

The worker node 112 may comprise the processor 304, which may be coupled to the system memory 306 and an external communication interface 308. A computer readable medium 310 may also be operatively coupled to the processor 304.

The computer readable medium 310 may comprise a number of software modules including a data structure management module 312 and a search processing module 314. More or fewer modules may be utilized to perform the functionality described herein.

In at least one example, the data structure management module 312 may comprise code that, when executed, causes the processor 304 to receive a hash map, a tree map and/or an indexed list. The data structure management module 312 may be configured to cause the processor 304 to store the received hash map(s), tree maps, and indexed list(s) on the distributed data store 120.

The data structure management module 312 may comprise code that, when executed, causes the processor 304 to receive a tree map update request message (e.g., from the manager node 110 of FIGS. 1 and 2). The tree map update request message may include a key (e.g., a minimum PAN) and a value (e.g., an index value) to be maintained by the worker node 112 within a tree map to be stored, or already stored, on the distributed data store 120. Upon receipt of the tree map update request message, the data structure management module 312 may cause the processor 304 to create and/or update a tree map stored in the distributed data store 120. In at least one example, the data structure management module 312 may be further configured to cause the processor 304 to send a tree map update response message to the manager node 110 (or another suitable requesting device), indicating whether creation/update of the tree map was successful or unsuccessful. The tree map update response message may include a reason code associated with a reason creation/update was unsuccessful (e.g., memory full, key already exists, etc.). In at least one example, an insertion and/or deletion performed on the tree map in response to the tree map update request message may cause the processor 304 to reconstruct/resort the tree map such that the keys (including the inserted key in an example in which a key is added) are sorted.

The search processing module 314 may comprise code that, when executed, causes the processor 304 to receive and process request messages (e.g., from the manager node 110 of FIGS. 1 and 2). In at least one embodiment, the search processing module 314 may be configured to cause the processor 304 to extract a key (e.g., a PAN) from a request message. The search processing module 314 may further be configured to cause the processor 304 to perform key ranges searches utilizing an internally-stored data structure (e.g., the hash map that maps PANs to tree maps such as data structure 500 of FIG. 5, discussed below). For example, the search processing module 314 may be configured to cause the processor 304 to input the PAN into a hash map and receive the returned identifier/location of a tree map (e.g., a tree map that maps minimum PANs to index values such as data structure 600 of FIG. 6, discussed below).

The search processing module 314 may cause the processor 304 to access the distributed data store 120 in order to access the identified tree map (e.g., a tree map that maps minimum PANs to index values, such as data structure 600 of FIG. 6, discussed below). The search processing module 314 may cause the processor 304 to utilize the received key (e.g., the PAN) to determine a minimum PAN for the key, the minimum PAN being a key within the tree map. For example, the search processing module 314 may cause the processor 304 to perform a number of comparisons between the PAN and one or more keys of the tree map. The specific operations performed for such comparisons is discussed below in connection with FIG. 6. Upon determining the tree map key (e.g., the minimum PAN) associated with the received key (e.g., the PAN), the search processing module 314 may cause the processor 304 to retrieve/receive the index value associated with the tree map key. In at least one example, the search processing module 314 may access stored indexed lists (e.g., an array/indexed list that maps index value to transaction processing data and/or an array/indexed list that maps index value to maximum PAN). Examples of the indexed lists accessed may include the data structure 700 and/or data structure 800 of FIGS. 7 and 8, discussed below. The indexed lists may be stored on the distributed data store 120, and/or the centralized data store 122. The search processing module 314 may cause the processor 304 to utilize the index value as input into an indexed list in order to obtain a maximum PAN that is associated with the index value (and thus, the originally received PAN). Similarly, the search processing module 314 may cause the processor 304 to utilize the index value as input into another indexed list in order to obtain transaction processing data that is associated with the index value (and thus, the originally received PAN). In at least one example, the search processing module 314 may be further configured to cause the processor 304 to transmit the obtained maximum PAN and/or the transaction processing data to the manager node 110 of FIGS. 1 and 2 in a response message.

Figure 4:
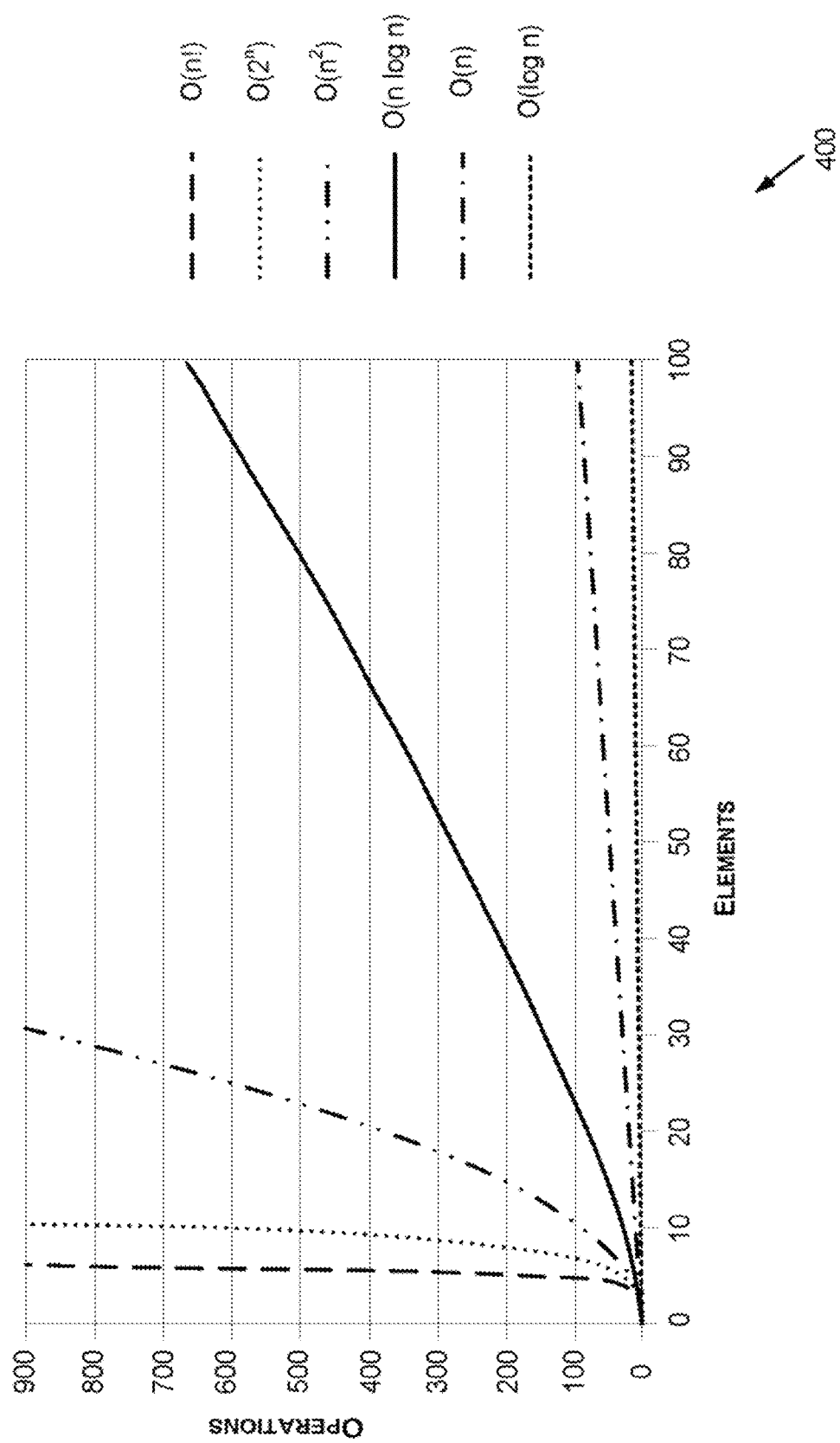
FIG. 4 shows an example graph depicting a number of algorithmic efficiencies.

FIG. 4 shows an example graph 400 depicting a number of algorithmic efficiencies. As discussed above, algorithmic complexity of an algorithm refers to an average or worst time runtime complexity of an algorithm. The algorithmic complexity of an algorithm specifies an average number of steps taken on any instance of size x. That is, the amortized runtime complexity of the algorithm is a function defined by a sequence of operations applied to the input of size x and averaged over time.

Algorithmic complexities are often denoted in "Big O notation." "O(log n)" is an example of an algorithmic complexity (log n) denoted with a capital "O." Big O notation is used to classify algorithms by how they respond to changes in input size, such as how the processing time of an algorithm changes as the problem size becomes extremely large. Thus, Big O notation characterizes functions according to their growth sizes such that different algorithms with the same growth rate may be represented using the same O notation. As an example, "O(log n)" indicates that the limiting behavior of an algorithm) has an order of (log n).

The graph 400 is intended to illustrate several different algorithmic complexities. For example, O(n!), O($2^n$), O($n^2$), O(n log n), O(n), and O(log n). The complexities provided are merely a few of many various complexities that may be utilized to classify/characterize an algorithms efficiency. O(1), which is not depicted, may also be used to classify an algorithm as having constant time. Algorithms that have constant time do not vary based on the size of the input. For example, determining if an integer is even or odd may be performed in constant time. Likewise, accessing a single element in an indexed list may be performed in constant time.

As a brief summary of the depicted complexities is provided. O(log n) is also referred to as "logarithmic time" and the logarithm is frequently base 2 although the notation is used regardless of the base of the logarithm. An example of an algorithm that operates in logarithmic time is a binary search. O(log n) algorithms are considered highly efficient, as the operations per instance required to complete decrease with each instance.

O(n) is also referred to as "linear time." An algorithm that runs in linear time means that for large enough input sizes, the running time increases linearly with the size of the input. An example of an algorithm that operates in linear time is an algorithm that finds the smallest or largest item in an unsorted list. Thus, as depicted in the graph 400, O(log n) is on an order that is more efficient than O(n) in that, as inputs grow large, the operations require to complete an instance of the algorithm having O(log n) complexity is quite lower than the operations required by an algorithm having O(n) complexity.

O(n log n) is also referred to as "linearithmic time." An example of an algorithm that operates in linearithmic time is a fastest-possible comparison sort. $O(n^2)$ is also referred to as "quadratic time," and an example of algorithms that operates in quadratic time includes bubble sort and insertion sort. $O(2^n)$ is also referred to as "exponential time," and an example of an algorithm that operates in exponential time is a brute force search. O(n!) is also referred to as "factorial time," and an example of an algorithm that operates in factorial time includes an algorithm for solving a problem such as "given a list of cities and the distances between each pair of cities, what is the shortest possible route that visits each city exactly once and returns to the original city?" The algorithmic complexities depicted in FIG. 4, from least efficient, to most efficient, are thus, O(n!), $O(2^n)$, $O(n^2)$, O(n log n), O(n), and O(log n).

Figure 5:
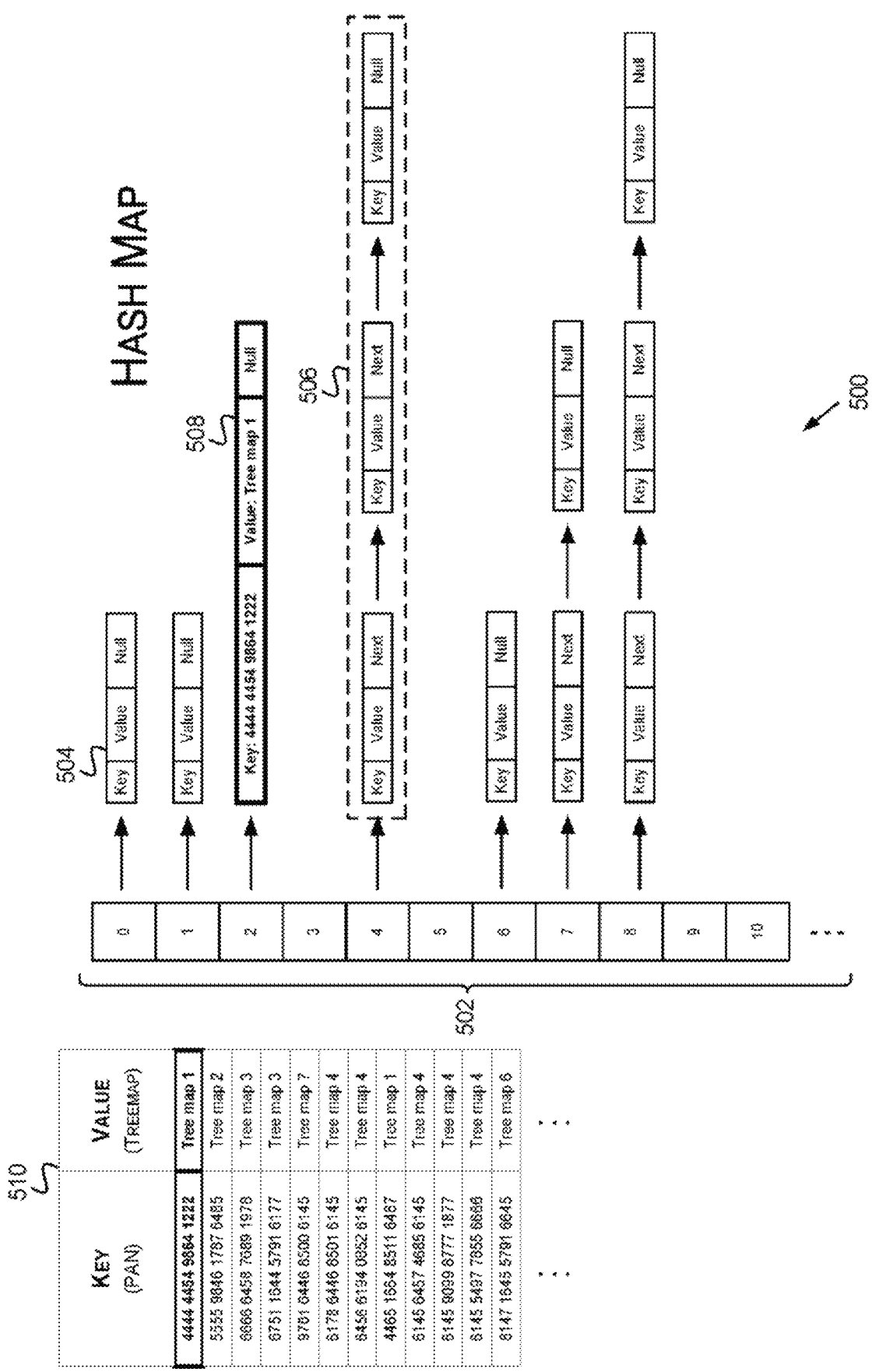
FIG. 5 shows a first example data structure that may be utilized by the distributed computing system in accordance with at least one embodiment.

FIG. 5 shows a first example data structure 500 that may be utilized by the distributed computing system (e.g., the distributed computing system 108 of FIG. 1) in accordance with at least one embodiment. In the example depicted in FIG. 5, the data structure 500 is a hash map. The data structure 500 may include a number of keys (e.g., keys 502). Each key may be associated with a linked list of key/value pairs. For example, key "0" of the data structure 500 may be associated with a linked list which includes key/value pair 504. Each element in the linked list associated with a key may point to the next element in the linked list, unless the element is the last in the linked list, in which case the pointer element may be null/unassigned. For example, see the linked list 506 of FIG. 5.

The data structure 500 may be utilized with a hash function to distribute a number of key/value pairs over the keys 502 in the data structure 500. In at least one example, the hash function utilized should maintain a "balanced hash map" in that key/value pairs are evenly distributed (e.g., the same/similar number of key/value pairs for each of the keys 502). Accordingly, an average time complexity for a well-balanced hash map may be performed in constant time (O(1)) while a worse-case scenario including a unevenly balanced hash map may be performed in linear time (O(n)).

By way of example, a hash function may be utilized to hash a key (e.g., a PAN such as "4444 4454 9864 1222"). The hashed key may equal "2" which may correspond to key "2" of the data structure 500. Accordingly, the key ("4444 4454 9864 1222") and it's corresponding value (e.g., "tree map 1," an identifier for a tree map) may be assigned to key "2" as depicted in FIG. 5. In at least one example, the corresponding value associated with the key may instead be a location in memory associated with a tree map (e.g., an identifier corresponding to a worker node of the distributed computing system 108 of FIG. 1, a memory address corresponding to a worker node and/or the tree map). The entry 508 may have its pointer element set to "null" given that it is the sole entry assigned to key "2."

In at least one example, each key in table 510 may be hashed with the hash function to determine an appropriate key within the data structure 500. Accordingly, an entry for each key/value pair in the table 510 may be inserted into the data structure 500 according to the hashed key. In at least one example, the manager node 110 of FIGS. 1 and 2 (or a component of the manager node 110, for example, the distribution module 212, the search processing module 214, etc.) may perform operations to create, manage, store, and/or access the data structure 500. In other examples, the worker node 112 of FIGS. 1 and 3 (or a component of the worker node 112) may perform operations to manage, store, and/or access the data structure 500. Thus, the data structure 500 may be stored in the manager node 110, the worker node 112 of FIGS. 1 and 3, and/or any suitable storage location.

In at least one embodiment, the data structure 500 may be stored on a manager node (e.g., the manager node 110 of FIGS. 1 and 2) or any suitable storage location/device. In some examples, the data structure 500 may conform to the memory constraints of the manager node 110. For example, if the manager node 110 has 256 GB of RAM, the data structure 500 may be no larger than 256 GB.

Figure 6:
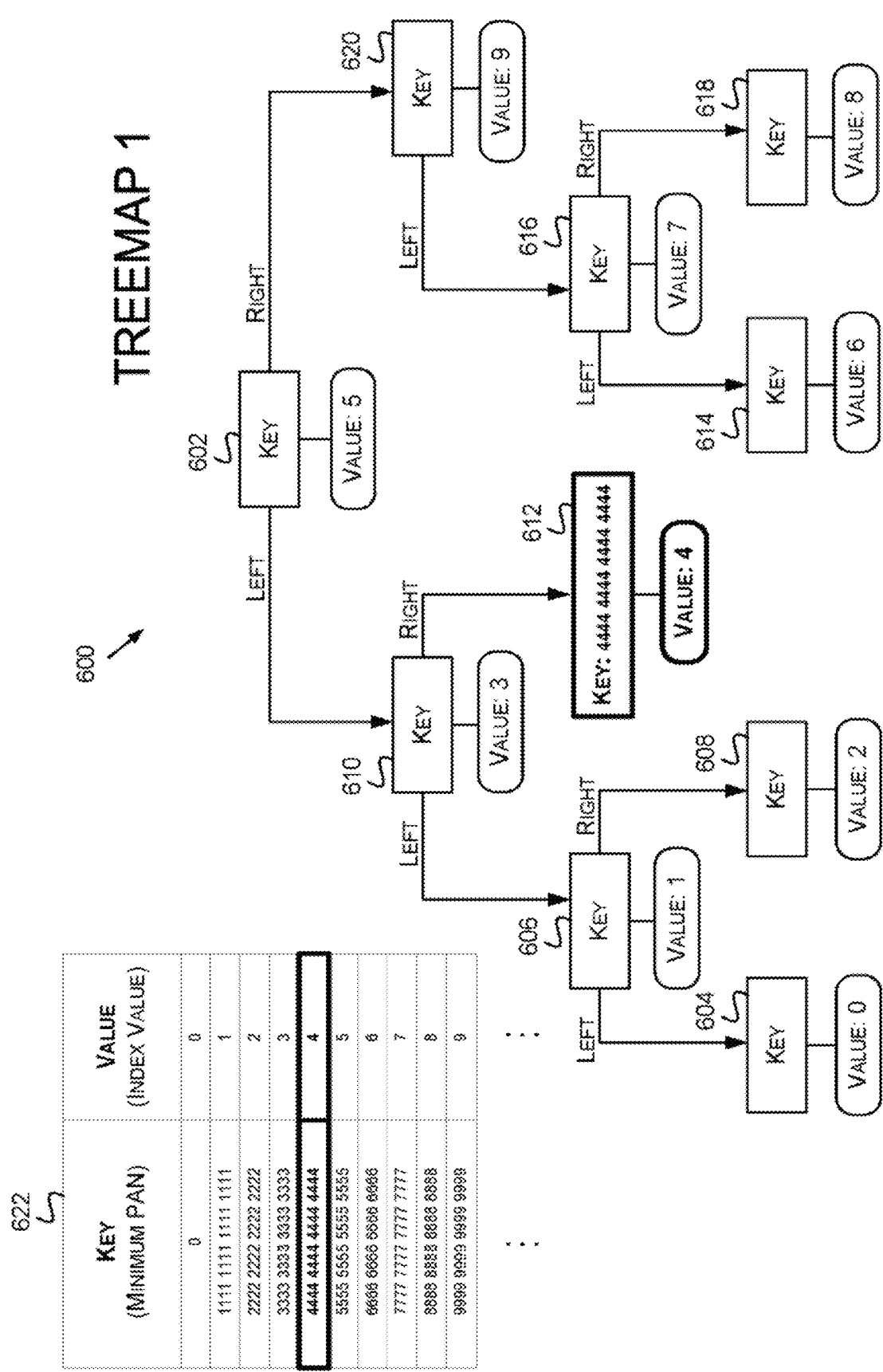
FIG. 6 shows a second example data structure that may be utilized by the distributed computing system in accordance with at least one embodiment.

FIG. 6 shows a second example data structure 600 that may be utilized by the distributed computing system (e.g., the distributed computing system 108 of FIG. 1) in accordance with at least one embodiment. In the example depicted in FIG. 6, the data structure 600 is a tree map. As such, the data structure 600 comprises a root node 602 and a number of child nodes (corresponding to keys 604-620). Each child node may include a key (e.g., a minimum PAN) and a value (e.g., an index value). The keys of the tree map (e.g., minimum PANs associated with PAN ranges) may be arranged/sorted according to their natural order. For example, key 604 may be less than key 606, which is less than key 608, which is less than 610, which is less than 612, which is less than the key of root node 602, which is less than key 614, which is less than key 616, which is less than key 618, which is less than 620. The table 622 may provide a tabular display of the key/value pairs of the data structure 600.

In at least one embodiment, the order of keys may be used to determine a second key from a first key. For example, given a first key (e.g., a PAN), the tree map may be traversed starting at the root node 602. The PAN may be compared to the key associated with the root node 602. If the key associated with root node 602 is greater than the PAN, the tree map may be traversed to the left. If the key associated with root node 602 is less than the PAN, the tree map may be traversed to the right. At each subsequent child node, a similar comparison may be made, that is, traverse to the left if the key of the current node is greater than the PAN, or to the right if the key of the current node is less than the PAN. A minimum PAN is determined when either the current node is less than PAN but has no right child nodes (then the current node's key is the minimum PAN) or when the current node is greater than the PAN but has no left child nodes (in which case the parent node of the child node is the minimum PAN).

Continuing with the example of FIGS. 5 and 6, a PAN of 4444 4564 9864 1222 may be received (e.g., via a request message). The PAN may be compared to the key at root node 602 (e.g., 5555 5555 5555 5555). Since the key at root node 602 is greater than the PAN, the tree map may be traversed to the left. The key 610 may equal 3333 3333 3333 3333 as specified in the table 622. The PAN may be compared to the key 610 and because the key 610 is less than the PAN, the tree map may be traversed to the right. Since the key 612 is less than the PAN and the node corresponding to the key 612 has no right child nodes, then the key 612 may be determined to be the minimum PAN corresponding to the PAN, in this case, 4444 4444 4444 4444. It should be appreciated that the examples given for determining a second key (e.g., the minimum PAN) using the first key (the PAN) are merely illustrative in nature. Other suitable means for determining a minimum PAN associated with the PAN may be utilized. In still further examples, the second key may be the same as the first key, or may be another suitable value other than a minimum PAN, that may be determined using the first key (e.g., by using the first key to perform a lookup that returns the second key).

In at least one example, once the minimum PAN is determined, the value associated with the minimum PAN may be returned. For example, either the value (e.g., corresponding to index value "4") may be returned as part of the traversal/comparison process described above, or the minimum PAN may be input as a key in the tree map and the index value may be returned.

In at least one embodiment, the data structure 600 may be stored on a worker node (e.g., the worker node 112 of FIGS. 1 and 3) or any suitable storage location/device. In some examples, the data structure 600 may conform to the memory constraints of the worker node 112. For example, if the worker node 112 has 128 GB of RAM, the data structure 600 may be no larger than 128 GB.

Figure 7:
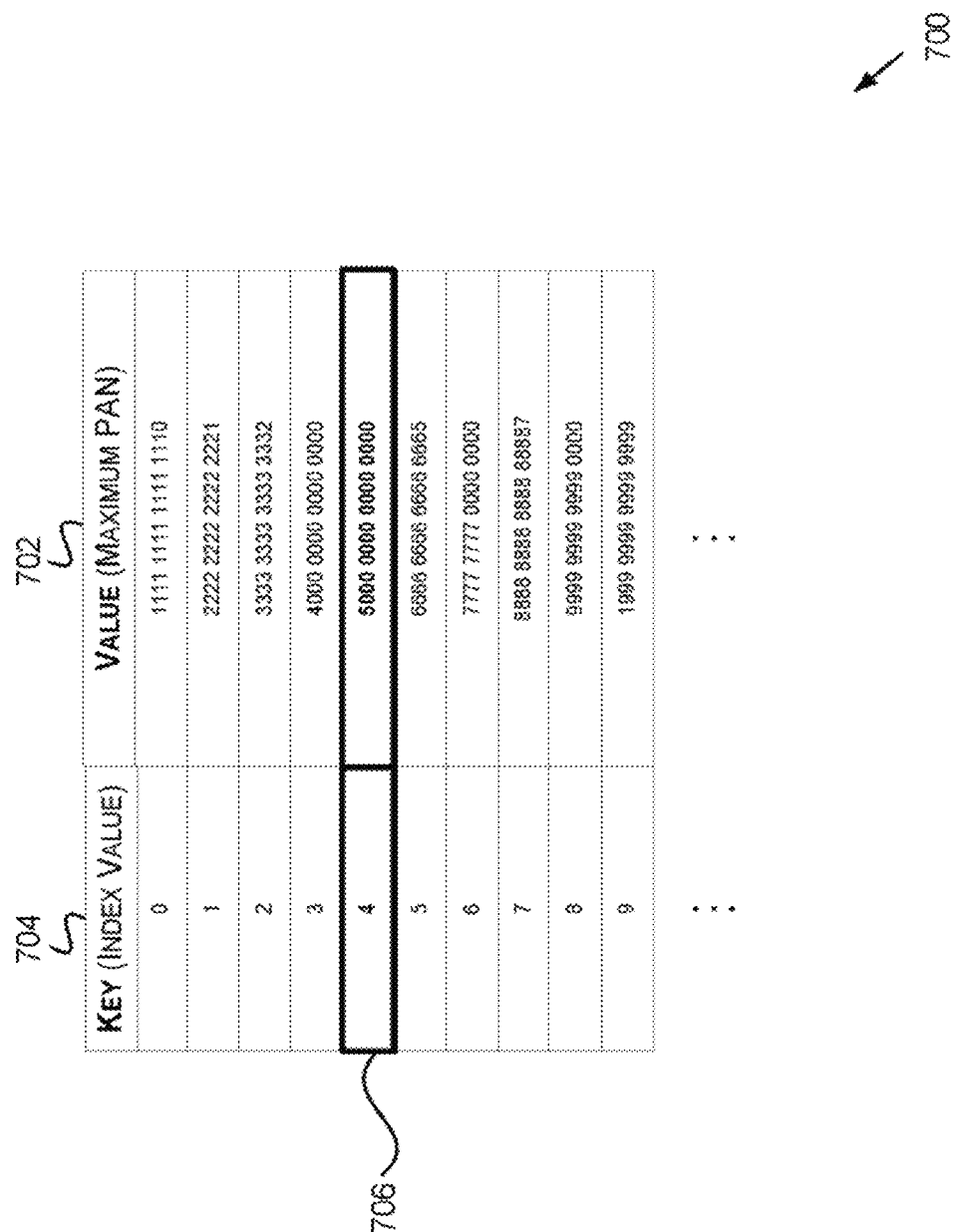
FIG. 7 shows a third example data structure that may be utilized by the distributed computing system in accordance with at least one embodiment.

FIG. 7 shows a third example data structure 700 that may be utilized by the distributed computing system in accordance with at least one embodiment. In the example depicted in FIG. 7, the data structure 700 is an array, although it may be any suitable indexed list. The data structure 700 may include a set of data (e.g., maximum PAN values included in column 702) that is indexed by a key (e.g., the index values of column 704).

Continuing with the example of FIGS. 5 and 6, the entry 706 may correspond to the maximum PAN associated with the minimum PAN "4444 4444 4444 4444" and accordingly, the PAN "4444 4454 9864 1222". As described above, account number "4444 4454 9864 1222" was mapped (e.g., in data structure 500) to "tree map 1" (e.g., the data structure 600). "Tree map 1" (the data structure 600) mapped the minimum PAN "4444 4444 4444 4444" corresponding to the PAN to index value "4." As part of a distribution process discussed herein, a corresponding maximum PAN (e.g., 5000 0000 0000 0000) may be associated with index value "4" in the data structure 700. Accordingly, inputting an index value of "4" may return the maximum PAN of "5000 0000 0000 0000." The data structure 700 may be stored, for example, in the centralized data store 122 of FIGS. 1-3 or another suitable location.

It should be appreciated that the data structure 700 may include a predefined number of entries, or the data structure 700 may dynamically grow as more transaction processing data associated with a minimum PAN/maximum PAN is received by the system. As a non-limiting example, transaction processing data (e.g., a protocol set for fraudulent transaction processing associated with a minimum PAN/ maximum PAN) may be received/obtained by the distributed computing system. In some cases (e.g., upon determining that the minimum PAN/maximum PAN ranges are non-contiguous), the maximum PAN for the transaction processing data may be added to the data structure 700 at a particular position corresponding to an index value of the data structure 700. The index value may be the same index value as provided by data structure 800 (discussed below) in connection with storing the transaction processing data.

In at least one embodiment, the centralized data store 122 may be responsible for maintaining the data structure 700, although other suitable storage locations may be utilized (e.g., the distributed data store 120, the distributed data store 116, etc.).

FIG. 8 shows a fourth example data structure 800 that may be utilized by the distributed computing system in accordance with at least one embodiment. In the example depicted in FIG. 8, the data structure 800 is an array, although it may be any suitable indexed list. The data structure 800 may include a set of data (e.g., transaction processing data included in column 702) that is indexed by a key (e.g., the index values of column 704).

Continuing with the example of FIGS. 5, 6, and 7, the entry 706 may correspond to the transaction processing data associated with the minimum PAN "4444 4444 4444 4444" and, accordingly, the PAN "4444 4454 9864 1222". As described above, account number "4444 4454 9864 1222" was mapped (e.g., in data structure 500) to "tree map 1" (e.g., the data structure 600). "Tree map 1" (the data structure 600) mapped the minimum PAN "4444 4444 4444 4444" corresponding to the PAN to index value "4." In some examples (where the minimum PAN/maximum PAN ranges are non-contiguous) the maximum PAN was determined by inputting index value "4" into the data structure 700. As part of a distribution process discussed herein, the corresponding transaction processing data (e.g., any suitable information associated with the minimum PAN/maximum PAN) may be associated with index value "4" in the data structure 800. Accordingly, inputting an index value of "4" into data structure 800 may return appropriate transaction processing data corresponding to the minimum PAN "4444 4444 4444 4444" and maximum PAN "5000 0000 0000 0000." The data structure 800 may be stored, for example, in the centralized data store 122 of FIGS. 1-3 or another suitable location. The data structure 800 may include a predefined number of entries, or the data structure 800 may dynamically grow as more transaction processing data associated with a minimum PAN/maximum PAN is received by the system.

As a non-limiting example, transaction processing data (e.g., a protocol set for fraudulent transaction processing associated with a minimum PAN/maximum PAN) may be received/obtained by the distributed computing system. The transaction processing data may be added to the data structure 800 at a particular position (e.g., a next available position such as "4") corresponding to an index value of the data structure 800. A maximum PAN associated with the transaction processing data may, in some examples, be added to the data structure 700 of FIG. 7 at a same position (e.g., "4") corresponding to the index value. The index value may be further added to a tree map (e.g., the data structure 600 located on a worker node for which memory (RAM) is still available) and associated with the minimum PAN associated with the transaction processing data. Further, a hash map (e.g., the data structure 500) may be updated to associate a particular PAN with the tree map that stores the corresponding minimum PAN.

In at least one embodiment, the centralized data store 122 may be responsible for maintaining the data structure 800, although other suitable storage locations may be utilized (e.g., the distributed data store 120, the distributed data store 116, etc.).

Figure 9:
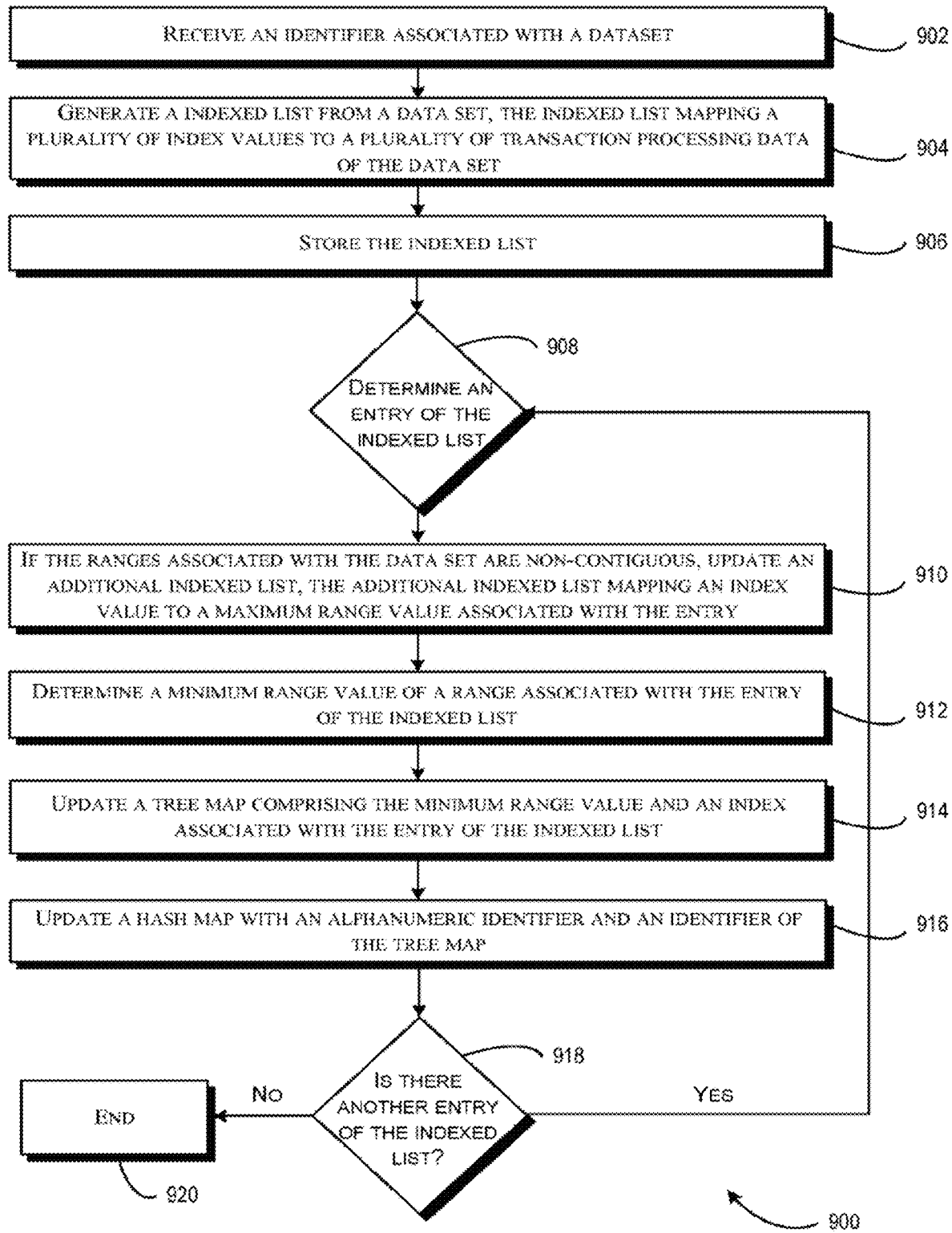
FIG. 9 shows a flow diagram illustrating an example process for distributing portions of a data set amongst a group of nodes in accordance with at least one embodiment.

FIG. 9 shows a flow diagram illustrating an example process 900 for distributing portions of a data set amongst a plurality of nodes in accordance with at least one embodiment. The process 900 may begin at block 902, where an identifier associated with a data set may be received (e.g., by manager node 110 of FIGS. 1 and 2). The identifier may be an alphanumeric label, an address, or an suitable data for identifying a data set. At block 904, an indexed list may be generated. The indexed list may map a plurality of index values to a plurality of transaction processing data of the data set. By way of example, the data set may comprise a number of protocol sets for determining whether a transaction is fraudulent. Each protocol set may be associated with a PAN range defined by a minimum PAN and a maximum PAN. In a non-limiting example, a financial institution may be associated with the PAN range, meaning the financial institution may only issue payment cards with personal card numbers that fall within its associated PAN range. The protocol set associated with the PAN range may therefore be associated with the financial institution. The transaction processing data (e.g., each protocol set) may be extracted from the data set and indexed to generate an indexed list of transaction processing data (such as the data structure 800 of FIG. 8).

At block 906, the indexed list may be stored (e.g., in the distributed data store 120 and/or the centralized data store 122 of FIG. 1). The indexed list may be accessible to the manager node 110 (and any other manager node of the distributed computing system 108) and the worker node 112 (and any other worker node of the distributed computing system).

At decision point 908, an entry of the indexed list may be determined (e.g., a first entry). As discussed above, the entry (of transaction processing data) may be associated with a particular minimum PAN and maximum PAN. At block 910, if the ranges associated with the data set are non-contiguous, an additional indexed list (such as the data structure 700 of FIG. 7) may be updated (and/or generated). In at least one example, the additional indexed list may map an index value of the entry to a maximum range value associated with the entry. In some examples, the same index value associated with transaction processing data may be used to associate the maximum range value of the additional indexed list. Accordingly, the maximum range value and the transaction processing data may be associated with the same index value of different indexed lists (e.g., the data structure 700 and the data structure 800. It should be appreciated that the indexed lists discussed in relation to this figure may be updated and/or generated in the reverse order, that is, an indexed list that maps maximum PANs in index values may be generated/updated prior to updating an indexed list that maps transaction processing data to index values. Thus, in some cases, the indexed list that maps transaction processing data to index values may utilize the index value assigned to the maximum PAN in the other indexed list. The indexed lists, or some portion of the indexed lists may be stored in the centralized data store 122 and/or the distributed data store 120 of the worker node 112).

At block 912, a minimum range value of a range associated with the entry of the indexed list may be determined. In at least one example, a tree map may be updated/created that maps the minimum range value of the range associated with the entry to the index value associated with the entry. In some cases, the tree map may be sent directly to the worker node 112 (to be stored in the distributed data store 120) or the centralized data store 122 to be stored. In alternative embodiments, a tree map update request message may be sent at block 914 (e.g., by the manager node 110). The tree map update request message may comprise the minimum range value and the index value associated with the entry of the indexed list. In other examples, the tree map update request message may include an entire tree map. In some examples receipt of the tree map update request message (e.g., by the worker node 112) may cause a tree map to be updated and/or created using the minimum range value and an index value associated with the entry of the indexed list (e.g., as a key/value pair of the tree map).

At block 916, a hash map may be created/updated (e.g., by the manager node 110 and stored in the distributed data store 116 or the distributed data store 120) to include an alphanumeric identifier (e.g., a PAN associated with the minimum range value, an alphanumeric identifier associated with the minimum range value, or any suitable alphanumeric identifier that is not associated with the minimum range value) and an identifier of a tree map. At decision point 918, a determination may be made as to whether another unprocessed entry of the indexed list exists. If no unprocessed entries exist, the method may end at block 920. If further unprocessed entries exist, the process may return to decision point 908. The process may repeat blocks 908-918 until there are no unprocessed entries in the indexed list, at which time, the process may end at block 920. The tree map (e.g., data structure 600 of FIG. 6) may be stored in the distributed data store 120 and/or the centralized data store 122.

Upon completion of the process 900, a hash map may be provided that maps each key (e.g., a PAN) to a tree map that maps a minimum range value associated with the key to an index value. In some examples, the hash map may be stored on the manager node 110 in the distributed data store 116 and/or on the worker node 112 in the distributed data store 120. In at least one embodiment the tree map may be stored on the worker node 112 (e.g., in the distributed data store 120). Other tree maps may be stored on various other worker nodes of a distributed computing system according to the memory constraints of each worker node. In at least one embodiment, the distributed data store 120 may be configured to store any suitable combination of the data structures 500-800. In at least one example, a copy of every data structure discussed herein, including the data structures 500, 600, 700 and/or 800) may be stored on one or more worker nodes (e.g., each worker node) in the distributed computing system. The indexed list(s) may be stored in any suitable location (e.g., in the distributed data store 116, the distributed data store 120, in the centralized data store 122, or the like).

Figure 10:
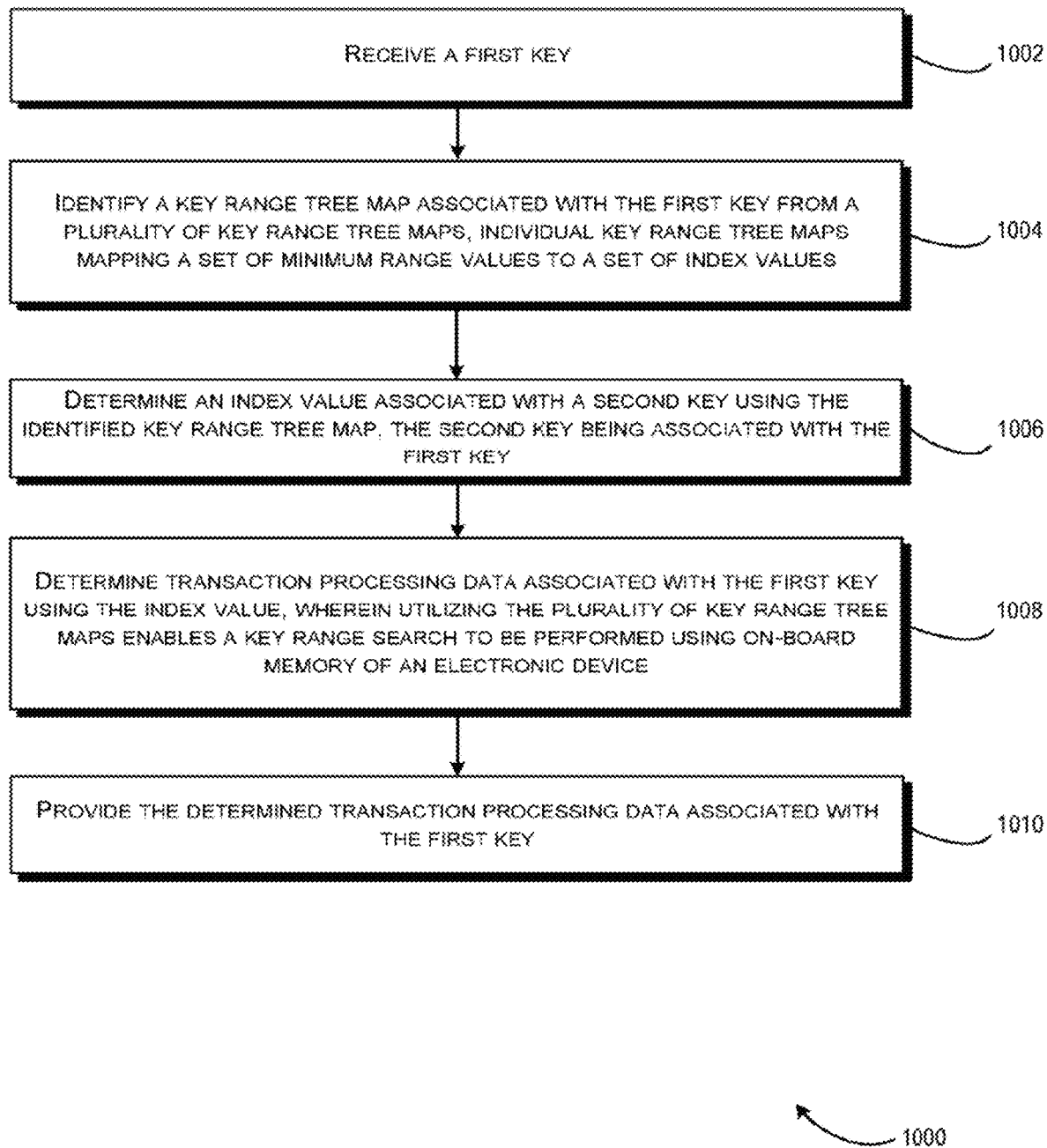
FIG. 10 shows a flow diagram illustrating an example process for conducting a search utilizing the data structures of FIGS. 5-7, in accordance with at least one embodiment.

FIG. 10 shows a flow diagram illustrating an example process 1000 for conducting a key range search utilizing the data structures of FIGS. 5-8, in accordance with at least one embodiment. The process 1000 may begin at block 1002 where a first key may be received (e.g., by the manager node 110 of FIGS. 1 and 2). In at least one example the first key comprises an alphanumeric identifier (e.g., a payment card number of a consumer, a PAN, a social security number, a temperature, etc.). The first key may be received, for example, by the manager node 110 via a request message.

At block 1004, a key range tree map associated with the first key may be identified from a plurality of key range tree maps. Each of the plurality of key range tree maps may map a set of minimum range values to a set of index numbers. Each of the plurality of tree maps may be configured to be loaded into on-board memory (e.g., RAM) of an electronic device (e.g., the worker node 112). As a non-limiting example, the manager node 110 upon receipt of the first key, may hash the first key and utilize the hashed key and a stored hash map (e.g., a hash map that maps keys to hash map identifiers/locations) to determine the key range tree map associated with the first key. In another example, the worker node 112 may perform such functions (e.g., receive the key, hash the key, use the hashed key to determine a stored hash map). In either example, the identified key range tree map may be located in memory on a particular worker node (e.g., the worker node 112).

At block 1006, an index value associated with a second key (e.g., a minimum PAN associated with the first key) may be determined utilizing the identified key range tree map. Such functions may be performed by the worker node 112. In some embodiments, the second key may be determined from the first key. In at least one example, the second key may be determined by comparing the first key to a number of keys contained in the tree map. The second key may be utilized as input into the key range tree map in order to determine the index value associated with the second key.

At block 1008, transaction processing data associated with the first key may be determined using the index value. For example, the worker node 112 may utilize the index value corresponding to the first key (as determined utilizing a key range tree map stored in the distributed data store 120, the key range tree map mapping minimum PANs to index values) to retrieve data (e.g., transaction processing data) from an indexed list. The indexed list may be stored in a location accessible to the worker node 112 (e.g., in the distributed data store 120, in the centralized data store 122, or any suitable storage location). The indexed list, as discussed above, may map index numbers to transaction processing data associated with the first key (the PAN) and the second key (the minimum PAN associated with the PAN). Thus, by inputting an index value, the transaction processing data corresponding to the first key may be returned.

At block 1010, the determined transaction processing data associated with the first key may be provided. For example, the worker node 112 may return the transaction processing data to the manager node 110 which may, in turn, provide the transaction processing data to an electronic device that initiated the request message.

TECHNICAL BENEFITS

Embodiments of the present invention may provide the ability for key range searches to be conducted more efficiently than the operations currently required in current distributed computing systems. Specifically, the hash map and the tree maps discussed above are capable of being loaded into on-board memory (e.g., RAM) of the storage device (e.g., the manager node, the worker node, etc.). In some examples, every data structure maintained by the system may be loaded in on-board memory of a device (e.g., a worker node). Accordingly, in some examples, searches may be conducted on a single device with constant algorithmic complexity (e.g., O(log n)). Additionally, in some examples, a dataset that is larger (e.g., 4 TB) than the storage capacity (e.g., 64 GB, 128 GB, etc.) of a single node in a distributed computing system may be distributed into customized data structures (e.g., one or more indexed lists, one or more tree maps, and a hash map). Utilizing the customized data structures discussed above provides constant algorithmic efficiency (O(log n)) when conducting a key range search providing an advantage over previous systems that provided variable search times. Utilizing multiple tree maps as discussed above provides an additional benefit of a reduction in maintenance costs associated with maintaining the data set. For example, a new entry in the data set need only cause an update of a single tree map, while the remaining tree maps remain unchanged. Additionally, the key range searches may be performed in less time as the memory being utilized by the manager node(s) and the worker node(s) is RAM which, by its very nature, is faster to search than data stored on disk (e.g., a hard drive).

EXAMPLE COMPUTER SYSTEMS

The various participants and elements described herein may operate one or more computer apparatuses to facilitate the functions described herein. Any of the elements in the above-described FIG. 1, including any servers or databases, may use any suitable number of subsystems to facilitate the functions described herein.

Examples of such subsystems or components shown in the above figures may be interconnected via a system bus. Additional subsystems such as a printer, keyboard, fixed disk (or other memory comprising computer readable media), monitor, which is coupled to display adapter, and others may be included. Peripherals and input/output (I/O) devices, which couple to I/O controller (which can be a processor or other suitable controller), can be connected to the computer system by any number of means known in the art, such as a serial port. For example, the serial port or an external interface can be used to connect the computer apparatus to a wide area network such as the Internet, a mouse input device, or a scanner. The interconnection via system bus allows the central processor to communicate with each subsystem and to control the execution of instructions from system memory or a fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
generating a first indexed list comprising a plurality of entries that comprise a plurality of index values and a plurality of data instances respectively corresponding to the plurality of entries;
generating a first tree map with nodes mapping minimum range values to the plurality of index values;
generating a second tree map that is different from the first tree map, the second tree map mapping at least one minimum range value to at least one index value of the first indexed list;
sorting nodes of the first tree map according to corresponding minimum range values associated with the nodes of the first tree map; and
generating a hash map comprising a plurality of hash values formed from hashed keys, and a corresponding plurality of key values, the key values comprising locations of the first tree map and the second tree map.

2. The method of claim 1, wherein sorting the nodes of the first tree map enables derivation of a specific index value for a minimum range value based at least in part on a traversal of the first tree map and performing comparisons of the minimum range value to one or more keys corresponding to respective nodes of the first tree map, wherein particular steps of the traversal of the first tree map is determined based at least in part on the comparisons.

3. The method of claim 1, further comprising storing the first indexed list, the first tree map, and the hash map on different nodes of a distributed system.

4. The method of claim 1, wherein the method further comprises:
   determining a maximum range value of a numerical range associated with a particular data instance of the plurality of data instances; and
   generating or updating a second indexed list based at least in part on the maximum range value, the second indexed list being configured to map a set of index values to one or more maximum range values individually corresponding to a particular numerical range, the second indexed list maintaining a mapping between a particular index value and the maximum range value.

5. The method of claim 4, wherein the particular index value is mapped to the maximum range value of the second indexed list, and wherein the particular index value is mapped to the particular data instance of the first indexed list.

6. The method of claim 1, wherein the first indexed list, the first tree map, and the hash map enable execution of a subsequent key-range search.

7. The method of claim 1, wherein the plurality of data instances comprises one or more protocol sets associated with determining whether a transaction is fraudulent.

8. The method of claim 1, wherein the first indexed list, the first tree map, and the hash map are configured to be stored in local memory at respective computing nodes of a distributed system.

9. The method of claim 1, wherein respective memory sizes of the first indexed list, the first tree map, and the hash map are configured based at least in part on corresponding memory resources of respective computing nodes on which they are stored.

10. A computing device, comprising:
    one or more processors, and
    a computer readable medium coupled to the processor, the computer readable medium comprising computer-executable instructions that, when executed by the one or more processors, cause the computing device to:
       generate a first indexed list comprising a plurality of entries that comprise a plurality of index values and a plurality of data instances respectively corresponding to the plurality of entries;
       generate a first tree map with nodes mapping minimum range values to the plurality of index values;
       generate a second tree map that is different from the first tree map, the second tree map mapping at least one minimum range value to at least one index value of the first indexed list;
       sort nodes of the first tree map according to corresponding minimum range values associated with the nodes of the first tree map; and
       generate a hash map comprising a plurality of hash values formed from hashed keys, and a corresponding plurality of key values, the key values comprising locations of the first tree map and the second tree map.

11. The computing device of claim 10, wherein executing the computer-executable instructions further causes the computing device to:
    determine that a set of numerical ranges individually associated with the plurality of data instances are non-contiguous;
    in response to determining that the set of numerical ranges are non-contiguous, generate an additional indexed list, the additional indexed list associating an additional plurality of index values to a plurality of maximum range values of the set of numerical ranges; and
    store the additional indexed list.

12. The computing device of claim 10, wherein the first tree map is one of a plurality of tree maps stored by a plurality of worker nodes of a distributed system, wherein the plurality of tree maps individually store respective minimum range values corresponding to a portion of the plurality of data instances, and wherein the plurality of tree maps comprises the second tree map.

13. The computing device of claim 10, wherein executing the computer-executable instructions further causes the computing device to generate a node for the first tree map, wherein generating the node comprises transmitting, to a worker node of a distributed system, a request to update the first tree map.

14. The computing device of claim 10, wherein at least one key value of the corresponding plurality of key values indicates the location of the first tree map.

15. The computing device of claim 10, wherein a respective indexed list, a respective tree map, and a respective hash map are updated for each of the plurality of data instances.

16. The computing device of claim 10, wherein the first tree map is stored in a first memory resource of a first worker node of a distributed system, and wherein the second tree map is stored in a second memory resource of a second worker node of the distributed system.

17. The computing device of claim 16, wherein the first memory resource is configured to store more data than the second memory resource.

18. The computing device of claim 10, wherein executing the computer-executable instructions further causes the computing device to store the hash map in local memory at a manager node of a distributed system, the distributed system comprising the manager node and one or more worker nodes.

19. The computing device of claim 10, wherein utilizing the first indexed list, the first tree map, and the hash map enables a subsequent key-range search to be performed in logarithmic time.

* * * * *